(12) United States Patent
Kim et al.

(10) Patent No.: US 10,846,695 B2
(45) Date of Patent: Nov. 24, 2020

(54) PAYMENT OPERATION METHOD AND ELECTRONIC DEVICE FOR SUPPORTING THE SAME

(71) Applicant: Samsung Electronics Co., Ltd., Gyeonggi-do (KR)

(72) Inventors: Ki Bong Kim, Daegu (KR); June Yeob Kim, Daegu (KR); Seon Sook Lee, Gyeongsangbuk-do (KR); Young Jun Jung, Daegu (KR)

(73) Assignee: Samsung Electronics Co., Ltd (KR)

( * ) Notice: Subject to any disclaimer, the term of this patent is extended or adjusted under 35 U.S.C. 154(b) by 447 days.

(21) Appl. No.: 15/210,524

(22) Filed: Jul. 14, 2016

(65) Prior Publication Data
US 2017/0017961 A1 Jan. 19, 2017

(30) Foreign Application Priority Data
Jul. 14, 2015 (KR) ........................ 10-2015-0100115

(51) Int. Cl.
*G06Q 20/40* (2012.01)
*G06Q 20/32* (2012.01)
(Continued)

(52) U.S. Cl.
CPC ........... *G06Q 20/401* (2013.01); *G06Q 20/10* (2013.01); *G06Q 20/204* (2013.01); *G06Q 20/32* (2013.01);
(Continued)

(58) Field of Classification Search
CPC ........... G06Q 20/3278; G06Q 20/3272; G06Q 20/353; G06Q 20/367
See application file for complete search history.

(56) References Cited

U.S. PATENT DOCUMENTS 8,560,007 B2   10/2013   Seon et al.
8,628,012 B1   1/2014    Wallner
(Continued)

FOREIGN PATENT DOCUMENTS

KR   2016120410 A   *   4/2015   ............. G06K 7/084

OTHER PUBLICATIONS

Atul Kumar. Security Analysis of Mobile Payment Systems. A thesis submitted for the degree of Master of Science in Security and Privacy. EIT ICT Labs Master School University of Twente, The Netherlands (Jul. 2015). (Year: 2015).*
(Continued)

*Primary Examiner* — Virpi H Kanervo
(74) *Attorney, Agent, or Firm* — The Farrell Law Firm, P.C.

(57) ABSTRACT

An electronic device and a payment method are provided. The electronic device includes a first communication circuitry configured to support a first payment function, a second communication circuitry configured to support a second payment function, and a processor configured to operatively connect with each of the first communication circuitry and the second communication circuitry, to output a first user interface (UI) corresponding to a payment request, to obtain payment related information using at least one of the first communication circuitry, the second communication circuitry, or a sensor circuitry operatively connected with the processor, and to output a second UI based on the payment related information.

20 Claims, 8 Drawing Sheets

(51) Int. Cl.
  *G06Q 20/10* (2012.01)
  *G06Q 20/20* (2012.01)
  *G06Q 20/34* (2012.01)

(52) U.S. Cl.
  CPC ....... *G06Q 20/327* (2013.01); *G06Q 20/3278* (2013.01); *G06Q 20/34* (2013.01)

(56) References Cited

U.S. PATENT DOCUMENTS

| | | | |
|---|---|---|---|
| 8,690,059 B1 | 4/2014 | Wallner | |
| 2002/0143432 A1* | 10/2002 | Gotfried | G07F 17/0014 700/233 |
| 2012/0009871 A1 | 1/2012 | Seon et al. | |
| 2012/0135681 A1 | 5/2012 | Adams et al. | |
| 2013/0110603 A1* | 5/2013 | Chi | G06Q 20/3224 705/14.23 |
| 2013/0141567 A1 | 6/2013 | Walker et al. | |
| 2014/0122328 A1 | 5/2014 | Grigg | |
| 2014/0258132 A1* | 9/2014 | Swamy | G06Q 20/3272 705/67 |
| 2014/0297539 A1 | 10/2014 | Swamy et al. | |
| 2014/0297540 A1 | 10/2014 | Swamy et al. | |
| 2015/0112868 A1 | 4/2015 | Swamy et al. | |
| 2016/0026343 A1* | 1/2016 | Finkenstadt | G06Q 30/0641 715/765 |
| 2016/0253666 A1* | 9/2016 | Lee | G06Q 20/4012 705/72 |
| 2016/0314431 A1* | 10/2016 | Quezada | G06Q 10/087 |

OTHER PUBLICATIONS

Ali Salman: "Samsung Acquires LoopPay Introduces NFC and Magnetic Secure Transmission Methods", XP055284217, WCCFtech, Feb. 20, 2015, 2 pages.
Scott Stein: "Samsung's LoopPay: What it is, and why you should care—CNET", XP055284202, Feb. 19, 2015, 3 pages.
European Search Report dated Dec. 9, 2016 issued in counterpart application No. 16179502.6-1955, 7 pages.
European Search Report dated Jan. 15, 2018 issued in counterpart application No. 16179502.6-1217, 6 pages.

* cited by examiner

PAYMENT OPERATION METHOD AND ELECTRONIC DEVICE FOR SUPPORTING THE SAME

PRIORITY

This application claims priority under 35 U.S.C. § 119(a) to a Korean Patent Application No. 10-2015-0100115 filed in the Korean Intellectual Property Office on Jul. 14, 2015, the entire disclosure of which is incorporated herein by reference.

BACKGROUND

1. Field of the Disclosure

The present disclosure relates to generally payment operations, and more specifically to an electronic device and method for performing payment operations.

2. Description of the Related Art

An electronic device may provide a variety of functions to its user. For example, an electronic device may perform a payment function as well as a call function and a multimedia function. The electronic device may have a communication function for communicating information with an external device. The electronic device may transmit to or receive from the external device, information associated with payment using the communication function. The electronic device may support, for example, a near field communication (NFC) function, a magnetic secure transmission (MST) function, and the like, as at least part of the communication function.

A conventional electronic device may send payment information based on a single specific communication method to perform payment. For example, the electronic device may employ an NFC mode to send payment information or may use a near field magnetic data stripe transmission mode for simulating magnetic stripe transmission mode or an MST mode to perform data transmission using a card. If each of a plurality of payment receiving devices that receives payment information from the electronic device supports only one communication mode, a user of the electronic device must check and select a communication mode supported by each of the plurality of payment receiving devices.

SUMMARY

An aspect of the present disclosure is to address at least the above-mentioned problems and/or disadvantages and to provide at least the advantages described below. Accordingly, an aspect of the present disclosure is to provide a method and apparatus for automatically selecting a communication mode (or kind, or method) based on a payment environment without a separate user selection input and providing a related user interface (UI).

Accordingly, another aspect of the present disclosure is to provide a method and apparatus for converting a current payment mode into a corresponding payment mode if a response corresponding to one of near field communication (NFC) and magnetic secure transmission (MST) is received.

In accordance with an aspect of the present disclosure, an electronic device is provided. The electronic device includes a first communication module configured to support a first payment mode, a second communication module configured to support a second payment mode, and a processor configured to operatively connect with each of the first communication module and the second communication module, to output a first user interface (UI) corresponding to a payment request, to obtain payment related information using at least one of the first communication module, the second communication module, or a sensor module operatively connected with the processor, and to output a second UI based on the payment related information.

In accordance with another aspect of the present disclosure, a payment operation method is provided. The method includes outputting a first user interface (UI) associated with guiding a payment function and sending, if a sensor signal is collected, payment related information while a second UI different from the first UI is output.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS OF THE PRESENT DISCLOSURE

Figure 1:
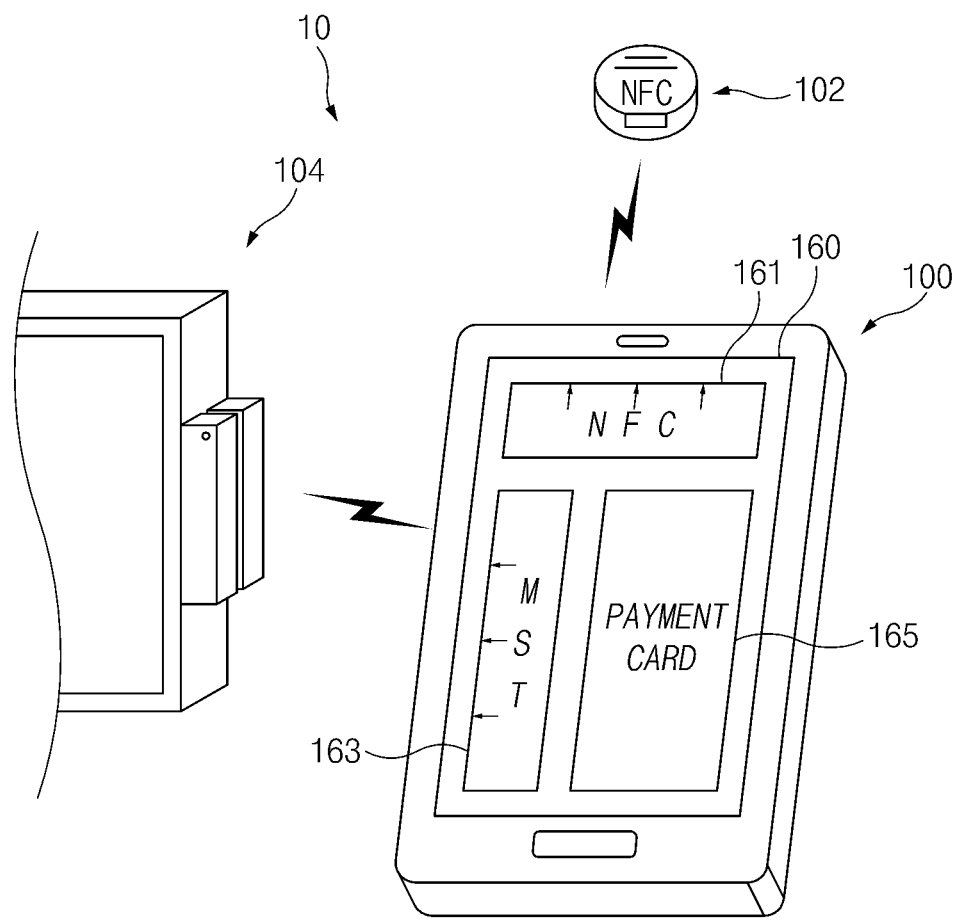
FIG. 1 is a diagram illustrating a payment operation environment of an electronic device according to embodiments of the present disclosure.

Hereinafter, embodiments of the present disclosure are described with reference to the accompanying drawings. However, the present disclosure is not intended to be limited to the specific embodiments disclosed herein, and it is understood that it should include all modifications and/or, equivalents and substitutes within the scope and technical range of the present disclosure. With respect to the drawings and the corresponding descriptions, like reference numerals refer to the same or similar elements.

Herein, the expressions "have", "may have", "include" and "comprise", or "may include" and "may comprise", may indicate existence of corresponding features (e.g., elements such as numeric values, functions, operations, or components), but do not exclude the presence of additional features.

Herein, the expressions "A or B", "at least one of A or/and B", "one or more of A or/and B", and the like may include any and all combinations of one or more of the associated listed items. For example, the terms "A or B", "at least one of A and B", and "at least one of A or B" may refer to any of the cases in which (1) at least one A is included, (2) at least one B is included, and (3) both of at least one A and at least one B are included.

Expressions such as "1st", "2nd", "first", or "second", and the like, as used herein with respect to embodiments of the present disclosure may refer to various elements, irrespective of the order and/or priority of the corresponding elements, but do not limit the corresponding elements. Certain expressions may be used to distinguish one element from another element. For instance, both "a first user device" and "a second user device" indicate different user devices, irrespective of the order and/or priority of the corresponding elements. For example, a first component may be referred to as a second component, and vice versa, without departing from the scope of the present disclosure.

When an element (e.g., a first element) is referred to as being "(operatively or communicatively) coupled with/to" or "connected to" another element (e.g., a second element), the element can be directly coupled with/to or connected to the other element or an intervening element (e.g., a third element) may be present. By contrast, when an element (e.g., a first element) is referred to as being "directly coupled with/to" or "directly connected to" another element (e.g., a second element), there are no intervening elements (e.g., a third element).

Depending on the situation, the expression "configured to", as used herein, may be used interchangeably with, for example, the expressions "suitable for", "having the capacity to", "designed to", "adapted to", "made to", or "capable of". The term "configured to" is not limited to only mean "specifically designed to" with respect to hardware. Instead, the expression "a device configured to" may mean that the device is "capable of" operating together with another device or other components. For example, a "processor configured to perform A, B, and C" may refer to a generic-purpose processor (e.g., a central processing unit (CPU) or an application processor) that may perform corresponding operations by executing one or more software programs which stores a dedicated processor (e.g., an embedded processor) for performing a corresponding operation.

Terms used herein may be used to describe specified embodiments of the present disclosure, but do not limit the scope of the present disclosure. The terms presented in a singular form may include plural forms unless otherwise specified. Unless otherwise defined herein, all the terms used herein, which include technical and scientific terms, may have the same definition that is generally understood by a person skilled in the art. It will be further understood that terms that are defined in a dictionary and commonly used, should also be interpreted as is customary in the relevant related art, and not in an idealized or overly formal detect unless expressly so defined herein in embodiments of the present disclosure. In some cases, even terms that are defined in the specification may not be interpreted to exclude embodiments of the present disclosure.

Hereinafter, electronic devices according to embodiments of the present disclosure will be described with reference to the accompanying drawings. The term "user", as used herein, may refer to a person who uses an electronic device or may refer to a device (e.g., an artificial intelligence electronic device) that uses an electronic device.

FIG. 1 is a diagram illustrating a payment operation environment of an electronic device according to embodiments of the present disclosure.

Referring to FIG. 1, an electronic device payment operation environment 10 includes, for example, at least one of an electronic device 100, a first payment processing device 102, and a second payment processing device 104. According to an embodiment of the present disclosure, the first payment processing device 102 or the second payment processing device 104 may be electronic device that are the same or similar type of electronic device as the electronic device 100. The electronic device payment operation environment 10 may further include a server that communicates with the first payment processing device 102, the second payment processing device 104, or the electronic device 100. The server may provide, for example, a variety of information associated with payment, or may provide authentication information about payment.

In the electronic device payment operation environment 10, the electronic device 100 may process payment based on at least one of the first payment processing device 102 or the second payment processing device 104. In this regard, the electronic device 100 may include a first communication module (or circuitry) that may communicate with the first payment processing device 102 to support a first payment mode (or method, or procedure, or function) and a second communication module (or circuitry) that may communicate with the second payment processing device 104 to support a second payment mode (or method, or procedure, or function). According to an embodiment of the present disclosure, the electronic device 100 may operate the first communication module during a first period and may operate the second communication module during a second period. If only the first payment processing device 102 near the electronic device 100 or if only the second payment processing device 104 is near the electronic device 100, the electronic device 100 may process payment without a user selection process.

If a request associated with operating a payment function is received, the electronic device 100 may output a first user interface (UI), including at least one of a first display object (e.g., an object for guiding payment processing based on the first payment processing device 102), a second display object (e.g., an object for guiding payment processing based on the second payment processing device 104), and a third display object 165 associated with a form of payment (e.g., card information) to be used, on its display 160. According to embodiments of the present disclosure, display forms or display contents of the first to third display objects 161 to 163, described herein below, are not necessarily limited to their descriptions in corresponding embodiments. Also, locations of the first to third display objects 161 to 165, output on the first UI, may be changed. Therefore, a user of the electronic device 100 may intuitively determine payment operation of the electronic device 100. If performing a payment processing operation associated with the second payment processing device 104, the electronic device 100 may output a second UI on the display 160. Alternatively, if performing a payment processing operation associated with the first payment processing device 102, the electronic device 100 may output a third UI on the display 160.

The first payment processing device 102 may process payment based on the first communication module of the electronic device 100. For example, the first payment processing device 102 may perform payment processing based on NFC communication. The first payment processing device 102 may establish a communication channel with the electronic device 100, may request the electronic device 100 to send information necessary for payment, and may receive the information from the electronic device 100. If the information necessary for the payment is received, the first payment processing device 102 may process the payment based on the received information and may send information (e.g., a payment result) associated with processing the payment to the electronic device 100.

The second payment processing device 104 may process, for example, payment based on the second communication module. For example, the second payment processing device 104 may perform payment processing based on MST communication. The second payment processing device 104 may receive information, necessary for payment, sent from the electronic device 100. If the information necessary for the payment is received, the second payment processing device 104 may process the payment based on the received information and may output audio information based on the completion of the payment.

According to an embodiment of the present disclosure, if a request to operate a payment function is received, the electronic device 100 may change, for example, at least one of the first communication module or the second communication module from an inactive state to an active state. The electronic device 100 may obtain a user input on the first display object 161 and the second display object 163 through an input device (e.g., a touch screen).

According to an embodiment of the present disclosure, the electronic device 100 may change a payment mode (or function) based on a user input on the first display object 161 or the second display object 163. For example, if a selection input for selecting the first display object 161 is received, the electronic device 100 may turn on/off a payment mode (e.g., an NFC mode) using the first communication module. For example, if a gesture input (e.g., a flick) for moving the first display object 161 in the direction of the edge of a screen is obtained, the electronic device 100 may change, for example, the first communication module from an active state to an inactivate state. Therefore, the electronic device 100 may support a payment mode (or function) using another communication module (e.g., the second communication module) rather than the first communication module.

If a gesture input (e.g., a flick) for moving the first display object 161 in the direction of the edge of a screen is obtained, the electronic device 100 may change, for example, display attributes (e.g., a color, a shape, transparency, and the like) of the first display object 161 or may remove the first display object 161 from the screen. The electronic device 100 may provide an effect in which the first display object 161 moves and disappear out of the screen.

For example, if a selection input on the second display object 163 is received, the electronic device 100 may turn on/off a payment mode (or function) (e.g., an MST mode) using the second communication module. For example, if a gesture input (e.g., a flick) for moving the second display object 163 in the direction of the edge of a screen is obtained, the electronic device 100 may change, for example, the second communication module from an active state to an inactivate state. Therefore, the electronic device 100 may support a payment mode (or function) using another communication module (e.g., the first communication module) rather than the second communication module.

If a gesture input (e.g., a flick) for moving the second display object 163 in the direction of the edge of a screen is obtained, the electronic device 100 may change, for example, display attributes (e.g., a color, a shape, transparency, and the like) of the second display object 163 or may remove the second display object 163 from the screen. The electronic device 100 may provide an effect in which the second display object 163 moves and disappears from the screen.

According to an embodiment of the present disclosure, the third display object 165 may represent, for example, information about a form of payment (e.g., a credit card, a bank account, a membership point, a mileage, or a bitcoin, and the like). For example, the electronic device 100 may change a payment means displayed on a screen based on a user input on the third display object 165. The third display object 165 may display, for example, information about a plurality of forms of payment.

According to an embodiment of the present disclosure, the electronic device 100 may further display information including at least one of an amount of payment, a type of a commodity/service, a title of a provider, or the remaining limit of a sum that is payable on the first UI or the second UI.

According to an embodiment of the present disclosure, the first payment processing device 102 or the second payment processing device 104 may be a device (i.e., a beacon device) that provides a beacon service or at least part of the beacon device. For example, the electronic device 100 may obtain information associated with a payment mode using beacon information received from the beacon device. For example, the electronic device 100 may verify information about a commodity/service using beacon information received from the beacon device and may provide the verified information to the user. If a payment request of the user is received, the electronic device 100 may display an available mode, verified using beacon information, on the first UI or the second UI.

According to an embodiment of the present disclosure, the electronic device 100 may connect with the server to specify a commodity/service or to register purchase intention or preference and the like for a commodity/service. For example, the electronic device 100 may send (e.g., broadcast) the information registered in the server. For example, if it is determined that the electronic device 100 is in a specification location, the electronic device 100 may send (e.g., broadcast) the information registered in the server. For example, if it is determined that the electronic device 100 is moved, the electronic device 100 may send (e.g., broadcast) the information registered in the server. For example, if a response to the sent information is received, the electronic device 100 may provide information, for guiding the reception of the response, to the user, or may display the first UI or the second UI on a screen.

According to an embodiment of the present disclosure, an operation of displaying a payment related UI, an operation of verifying motion of the electronic device 100, and the like may be performed, while other functions of the electronic device 100 are in a lock state.

For convenience of description, embodiments of the present disclosure refer an operation for a user device (e.g., a mobile device) as an example. However, embodiments of the present disclosure may not be limited thereto. For example, an operation may be performed in a commodity/service provider device (e.g., a point of sales (POS) device).

Figure 2:
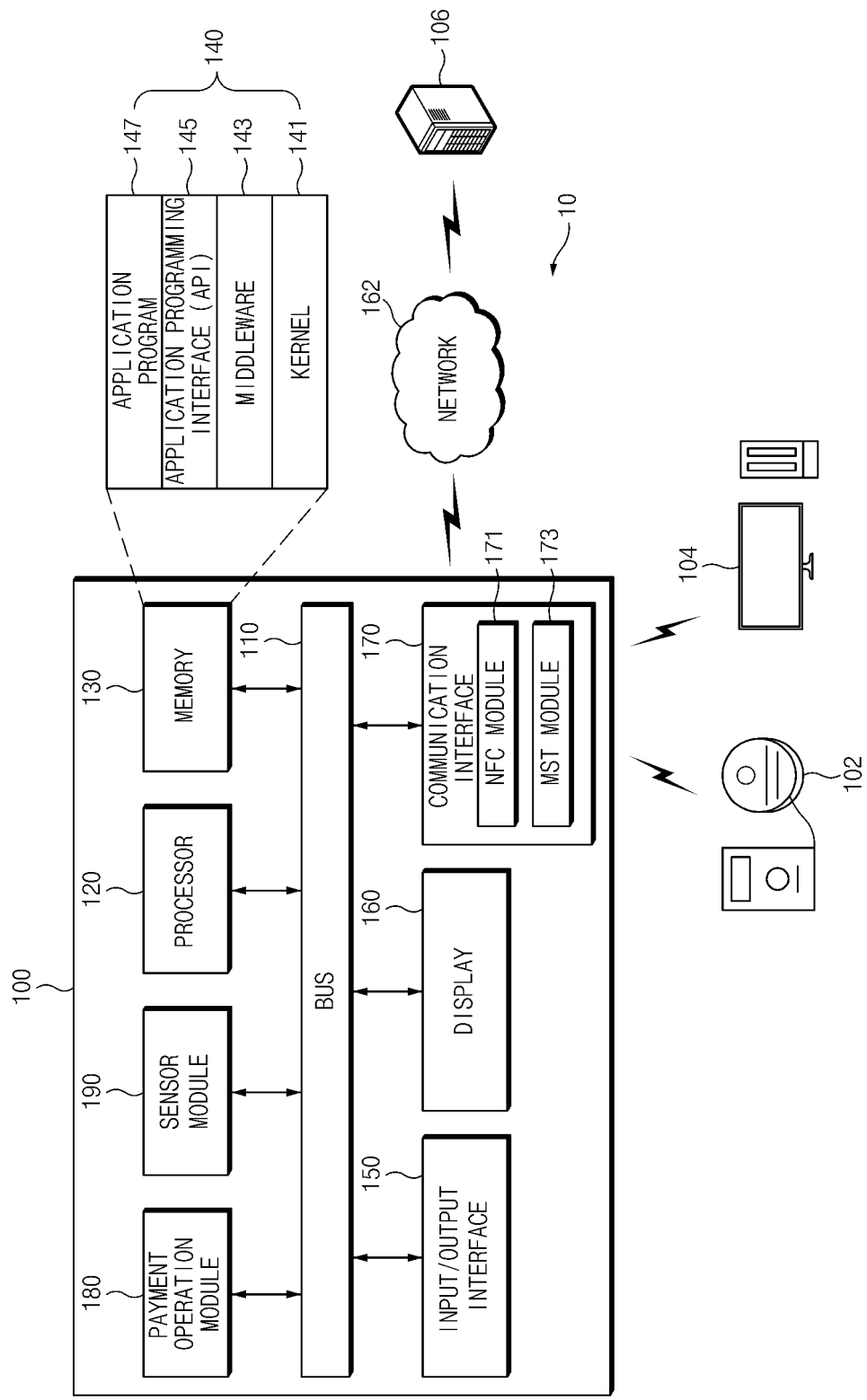
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an electronic device 100 may connect with a server 106 over a network 162. Also, the electronic device 100 may communicate with a first payment processing device 102 based on communication modules included in a communication interface 170 or may send specific payment related information to a second payment processing device 104. According to an embodiment of the present disclosure, the electronic device 100 may change a screen UI to be output, based on sensor information collected by a sensor module 190.

The network 162 may support to establish a communication channel between at least one electronic device and the server 106. For example, the network 162 may receive payment related information of the electronic device 100 from the electronic device 100, the first payment processing device 102, or the second payment processing device 104 and may send the received payment related information to the server 106. The network 162 may send payment completion information, provided from the server 106, to the electronic device 100, the first payment processing device 102, or the second payment processing device 104.

The server 106 may include, for example, a payment support server. The server 106 may establish, for example, a communication channel with the first payment processing device 102 or the second payment processing device 104 and may perform signaling associated with proceeding with payment. According to an embodiment of the present disclosure, the server 106 may include a token server, a card company server, and the like, associated with proceeding with payment. The server 106 may include a server that supports an additional service (e.g., a service for processing a mileage or discount) in connection with proceeding with the payment.

The electronic device 100 may include a bus 110, a processor 120, a memory 130, an input and output interface 150, a display 160, the communication interface 170, a payment operation module 180, and the sensor module 190.

The bus 110 may be, for example, a circuit that connects the components 120 to 170 with each other and transmits a communication signal (e.g., a control message and/or data) between the components 120 to 170.

The processor 120 may include one or more of a central processing unit (CPU), an application processor (AP), or a communication processor (CP). For example, the processor 120 may perform calculation or data processing about control and/or communication of at least another of the components of the electronic device 100. According to an embodiment of the present disclosure, the processor 120 may operate a payment application in response to a request of the payment operation module 180. The processor 120 may include the payment operation module 180. Alternatively, the payment operation module 180 may be implemented with at least one processor.

If a request to execute a payment function is received, the processor 120 may perform processing for alternately operating an NFC module 171 and an MST module 173 included in the communication interface 170. Also, the processor 120 may output a specific screen UI on the display 160 and may change the screen UI in response to collected sensor information.

The memory 130 may include a volatile and/or nonvolatile memory. The memory 130 may store, for example, a command or data associated with at least another of the components of the electronic device 100. The command may be executed by at least one of the processor 120 or the payment operation module 180. The command may include a command to activate the NFC module 171 and the MST module 173 based on a payment request, a command to output a first UI while the NFC module 171 and the MST module 173 alternately output payment related information, a command to collect sensor information, and the like. The command may include a command to output a second UI or a third UI based on a communication state if specific sensor information is collected.

The memory 130 may software and/or a program 140. The program 140 may include, for example, a kernel 141, a middleware 143, an application programming interface (API) 145, and/or at least one application program 147 (or "at least one application"), and the like. At least part of the kernel 141, the middleware 143, or the API 145 may be referred to as an operating system (OS). According to an embodiment of the present disclosure, the memory 130 may store a payment application and payment related information.

The kernel 141 may control or manage, for example, system resources (e.g., the bus 110, the processor 120, or the memory 130, and the like) used to execute an operation or function implemented in the other programs (e.g., the middleware 143, the API 145, or the application program 147). As the middleware 143, the API 145, or the application program 147 accesses a separate component of the electronic device 100, the kernel 141 may provide an interface that may control or manage system resources.

The middleware 143 may operate as, for example, a go-between such that the API 145 or the application program 147 communicates with the kernel 141 to communicate data. The middleware 143 may process one or more work requests, received from the application program 147, in order of priority. For example, the middleware 143 may assign priority that may use system resources (the bus 110, the processor 120, or the memory 130, and the like) of the electronic device 100 to at least one of the at least one application program 147. For example, the middleware 143 may perform scheduling or load balancing for the one or more work requests by processing the one or more work requests in order of priority assigned to the at least one of the application program 147.

The API 145 may be, for example, an interface in which the application program 147 controls a function provided from the kernel 141 or the middleware 143. For example, the API 145 may include at least one interface or function (e.g., a command) for file control, window control, image processing, or text control, and the like.

The payment application may receive a specific application identifier or payment request information including the specific application identifier from the payment operation module 180. The payment application may receive information associated with a commodity to pay in the received payment request information. The payment application may write payment related information based on the received information. In performing this operation, the payment application may request the payment operation module 180 to output at least one screen UI associated with proceeding with the payment.

The input and output interface 150 may operate as, for example, an interface that may send a command or data input from a user or another external device to another component (or other components) of the electronic device 100. Also, input and output interface 150 may output a command or data received from another component (or other components) of the electronic device 100 to the user or the other external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, a variety of content (e.g., text, images, videos, icons, or symbols, and the like) to the user. The display 160 may include a touch screen, and may receive, for example, touch, gesture, proximity, or a hovering input using an electronic pen or part of a body of the user.

According to an embodiment of the present disclosure, the display 160 may output the first UI associated with a payment request or may output the second UI or the third UI based on sensor information collected based on a gesture associated with processing payment or a communication connection state. Also, the display 160 may output a fourth UI associated with guide information, associated with a payment error, or payment completion.

The communication interface 170 may establish communication between, for example, the electronic device 100 and an external device (e.g., the first payment processing device 102, the second payment processing device 104, or the server 106). For example, the communication interface 170 may connect to the network 162 through wireless communication or wired communication to communicate with the external device (e.g., the server 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. The wireless communication may include, for example, local-area communication. The local-area communication may include, for example, at least one of wireless-fidelity (Wi-Fi) communication, Bluetooth (BT) communication, near field communication (NFC) communication, MST communication, or global navigation satellite system (GNSS) communication, and the like.

The electronic device 100 may send payment related data through the communication interface 170. The payment related data may include, for example, information stored in the memory 130 included in the electronic device 100. The memory 130 may be embedded in the electronic device 100 or may include a storage space connected to the electronic device 100. Also, the payment related data may be generated based on the stored information by a data generation module included in the electronic device 100. The payment related data generated by the data generation module may include, for example, security data or payment information. The security data may include, for example, data in which data stored in the memory 130 are encrypted. The payment information may include, for example, a primary account number (PAN), a device account number (DAN), virtual credit card information, a band information number (BIN), a card security code (CSC), a card verification value (CVV), or cryptogram, stored in the memory 130. For example, the communication interface 170 may include the data generation module.

According to embodiments of the present disclosure, the electronic device 100 may perform a payment function for commodity or service purchase using the communication interface 170. A user of the electronic device 100 may pay the cost of a commodity or service by sending payment information using the electronic device 100. The user may allow the electronic device 100 such as a smart phone or a tablet personal computer (PC) to make contact with the first payment processing device 102 (e.g., a credit card reader) and may proceed with payment.

The electronic device 100 may provide, for example, payment information, such as a credit card number, to the first payment processing device 102 or the second payment processing device 104. The electronic device 100 may perform a specific authentication process (e.g., a process of entering a password or a process of recognizing a fingerprint, and the like) in a payment process. The electronic device 100 may send payment information to the first payment processing device 102 or the second payment processing device 104 through local-area communication such as NFC communication or MST communication. The first payment processing device 102 or the second payment processing device 104 may pay based on the received payment information.

The communication interface 170 may include one or more sub-communication modules that may pay offline. The one or more sub-communication modules may include, for example, the NFC module 171 and the MST module 173.

For example, the NFC module 171 may support near field wireless communication for performing bidirectional communication of data in a specific frequency band (e.g., 13.56 MHz), between the electronic device 100 and a device (e.g., the first payment processing device 102) that mounts an NFC chip. The NFC module 171 may operate in a passive communication mode where it receives power from a magnetic field generated by an external device (e.g., the first payment processing device 102) and establishes a channel or an active communication mode where it directly generates a magnetic field and establishes a channel.

According to an embodiment of the present disclosure, the NFC module 171 may operate at a specific NFC signal period. If the NFC module 171 operates in the passive communication mode, the NFC signal period may be set to include only a passive communication interval. If the NFC module 171 operates in the active communication mode, the NFC signal period may be set to include a passive communication interval or an active communication interval. Another payment module that uses a different mode from the NFC module and the MST module 173 may be used rather than at least one of the NFC module 171 or the MST module 173.

According to an embodiment of the present disclosure, the electronic device 100 may be set to sequentially operate in both modes, i.e., the passive communication mode and the active communication mode, or may be set operate in only the passive communication mode in the entire period. If the electronic device 100 is set to operate in both modes, the electronic device 100 may operate at a period including an interval indicating the passive communication mode and an interval indicating the active communication mode.

The MST module 173 may be a wireless communication module that sends data through near field magnetic data stripe transmission or MST. The MST module 173 may generate a pulse based on payment related data and may convert the pulse into a magnetic field signal. The second payment processing device 104 may receive the data. An MST reader included in the second payment processing device 104 may restore the data by detecting the converted magnetic field signal and converting the detected magnetic field signal into an electric signal.

The MST module 173 may receive a control signal and payment information from a control circuit in the electronic device 100. The MST module 173 may convert payment information into a magnetic signal and may send the converted magnetic signal. For example, the MST module 173 may generate the same magnetic field signal as a magnetic field signal generated if the user swipes a magnetic stripe of a credit card through the second payment processing device 104. According to an embodiment of the present disclosure, payment information sent by the MST module 173 may be recognized by the second payment processing device 104. The MST module 173 may provide payment information to the second payment processing device 104 through unidirectional communication. The NFC module 171 and the MST module 173 are the one or more sub-communication modules. The scope and spirit of the present disclosure may not be limited thereto. For example, the NFC module 171 and the MST module 173 may mean other local-area communication modules.

According to an embodiment of the present disclosure, the electronic device 100 may simultaneously or sequentially send, for example, an NFC signal and an MST signal through the communication interface 170. The NFC module 171 and the MST module 173 may selectively send payment information to the first payment processing device 102 or the second payment processing device 104 based on a specific schedule or a signal period (e.g., one second). The NFC module 171 and the MST module 173 may selectively operate in a specific time interval to reduce power consumed by sending a signal and to prevent duplicate payment. Although the user does not select a communication method separately, he or she may proceed with payment by only an operation of allowing the electronic device 100 to make contact with a specific payment processing device.

The sensor module 190 may include at least one sensor that may collect sensor information associated with motion of the electronic device 100. The sensor module 190 may include an acceleration sensor, a gyro sensor, a geomagnetic sensor, and the like. According to an embodiment of the present disclosure, the sensor module 190 may be activated in connection with executing a payment function. The sensor module 190 may collect sensor information and may provide the collected sensor information to the payment operation module 180. The sensor module 190 may be deactivated when payment is completed, in response to control of the payment operation module 180. The sensor module 190 may include a biometric sensor (e.g., a fingerprint sensor). For example, the fingerprint sensor may be activated or deactivated in connection with a payment function. The sensor module 190 may connect with at least one of a first communication module (e.g., the NFC module 171), a second communication module (e.g., the MST module 173), or the processor 120. The sensor module 190 may be activated based on operation of at least one of the first communication module or a second communication module. Alternatively, the sensor module 190 may collect sensor information by being activating under control of the processor 120.

The payment operation module 180 may process a payment function of the electronic device 100. For example, the payment operation module 180 may activate the payment application in response to a user input. The payment operation module 180 may send payment related information. In this operation, the payment operation module 180 may process a user authentication function (e.g., a fingerprint authentication function and the like). The payment operation module 180 may activate the sensor module 190 in response to a request to execute a payment function to collect sensor information.

According to an embodiment of the present disclosure, if it is determined that a specific gesture operation occurs, the payment operation module 180 may change screen UIs associated with proceeding with payment, in response to a communication state. The payment operation module 180 may perform payment completion based on information received from the first payment processing device 102 or audio information output from the second payment processing device 104. The payment operation module 180 may provide a screen UI and may output guide information, based on the payment completion.

According to an embodiment of the present disclosure, the payment operation module 180 may send, for example, information associated with payment to the outside, while at least user authentication (e.g., fingerprint authentication) is valid. If specific user authentication is valid (e.g., if input authentication information corresponds to information stored in the electronic device 100), the payment operation module 180 communicates with the first payment processing device 102 through the first communication module (e.g., the NFC module 171) to process payment. If there is no user authentication, the payment operation module 180 may communicate with the second payment processing device 104 through the second communication module (e.g., the MST module 173) to process payment. If first user authentication (e.g., fingerprint authentication) is valid among a plurality of user authentication, the payment operation module 180 may communicate with the first payment processing device 102 through the first communication module (e.g., the NFC module 171) to process payment. If second user authentication (e.g., face authentication) is valid among the plurality of user authentication, the payment operation module 180 may communicate with the second payment processing device 104 through the second communication module (e.g., the MST module 173) to process payment.

Figure 3:
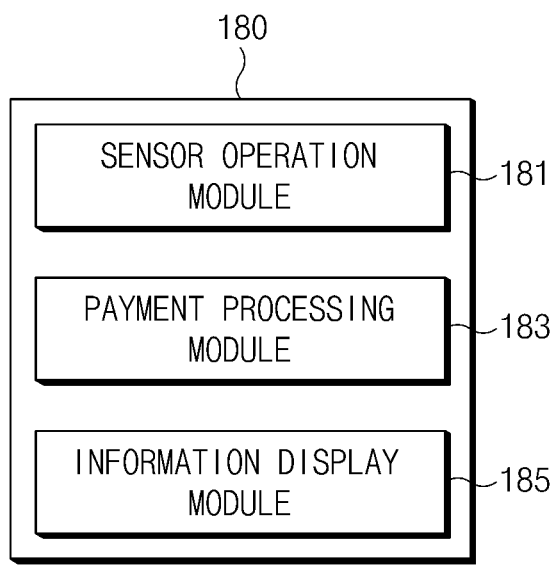
FIG. 3 is a block diagram illustrating a configuration of a payment operation module according to an embodiment of the present disclosure.

FIG. 3 is a block diagram illustrating a configuration of a payment operation module according to an embodiment of the present disclosure.

Referring to FIG. 3, a payment operation module 180 may include a sensor operation module 181, a payment processing module 183, and information display module 185.

If a request to execute a payment function is received, the sensor operation module 181 may activate a sensor module 190 of FIG. 2. For example, after the payment function is executed, if user authentication is completed, the sensor operation module 181 may collect first sensor information. The sensor operation module 181 may determine whether an electronic device 100 of FIG. 2 performs a specific operation, based on the collected first sensor information. For example, the sensor operation module 181 may determine whether the electronic device 100 moves at a specific distance or more in a specific direction. According to an embodiment of the present disclosure, the sensor operation module 181 may collect sensor information based on motion of allowing the electronic device 100 to make contact with a magnetic card reader or an NFC tag based on a user operation. If first sensor information is not collected within a specific time, the sensor operation module 181 may request the information display module 185 to output specific guide information. The specific guide information may include, for example, information for requesting to perform a gesture operation for proceeding with payment, information for requesting to perform user authentication again based on a lapse of a specific time, or information for automatically guiding an end as payment is not performed. In this regard, the sensor operation module 181 may output guide information, for collecting the first sensor information, through the information display module 185.

According to embodiments of the present disclosure, after collecting the first sensor information, the sensor operation module 181 determine whether second sensor information is collected in response to operation of a specific communication mode. The second sensor information may include, for example, sensor information corresponding to an operation of shaking or moving the electronic device 100 in a certain direction.

According to embodiments of the present disclosure, if the first sensor information is not collected within a specific time, the electronic device 100 may determine whether the second sensor information is collected. Also, although at least one of the first sensor information or the second sensor information is not collected, the electronic device 100 may request the payment processing module 183 to proceed with payment. The electronic device 100 may output a UI for guiding a user to shake the electronic device 100 without collection of the second sensor information, may send payment related information through its antenna, or may verify payment related information received through the antenna and may proceed with payment.

After collecting the first sensor information, if collecting the second sensor information, the sensor operation module 181 may send the collected second sensor information to the payment processing module 183. If collecting the second sensor information, the sensor operation module 181 may inactivate the sensor module 190. According to embodiments of the present disclosure, if information indicating payment completion is received, the sensor operation module 181 may inactivate the sensor module 190.

The payment processing module 183 may activate a payment application of the electronic device 100 may send payment related information. According to an embodiment of the present disclosure, the payment processing module 183 may execute the payment application in response to a user input or the arrival of a specific schedule. After executing the payment application, the payment processing module 183 may perform a user authentication process. If performing the user authentication process is performed normally, the payment processing module 183 may request the sensor operation module 181 to collect and process sensor information.

If the first sensor information is collected, the payment processing module 183 may determine whether a signal has been sent and received base on an NFC module 171 of FIG. 2 (e.g., based on whether a scan signal for scanning the NFC module 171 is received and a response signal corresponding to the scan signal is sent). If the signal is sent and received based on the NFC 171, the payment processing module 183 may send payment related information based on the NFC module 171. The payment processing module 183 may receive payment related information (e.g., payment completion information) from the first payment processing device 102 based on the NFC module 171. If the payment completion information is received, the payment processing module 183 may inform the sensor operation module 181 that the payment completion information is received. If a communication channel based on the NFC module 171 is established, the payment processing module 183 may notify the information display module 185 that the payment completion information is received.

According to embodiments of the present disclosure, after the first sensor information is collected, if the communication channel based on the NFC module 171 is not established within a specific time, the payment processing module 183 may send payment related information based on the MST module 173. The payment processing module 183 may send a signal based on the MST module 173. If payment processing based on the MST module 173 is not completed within a specific time, the payment processing module 183 may send payment related information based on the NFC module 171.

According to an embodiment of the present disclosure, the sensor operation module 181 may determine whether the second sensor information is collected. After the first sensor information is collected, the payment processing module 183 may send an operation state for the MST module 173 to the information display module 185 while sending payment related information based on the MST module 173. If the second sensor information from the sensor operation module 181 is received, the payment processing module 183 may determine that payment is completed. The payment processing module 183 may send an operation state, corresponding to the completion of the payment, to the information display module 185.

According to an embodiment of the present disclosure, the payment processing module 183 may process payment based on payment related information received from an external device (e.g., a server 106 of FIG. 2). For example, if a second payment processing device 104 of FIG. 2 receives payment related information sent through the MST module 173 and approves payment, it may inform the server 106 that the payment is approved. The server 106 may send information indicating that the payment is approved to the electronic device 100. Receiving the information indicating that the payment is approved, the payment processing module 183 may determine that the payment is completed.

The information display module 185 may output a screen interface of the electronic device 100. If a request to execute a payment function is received, the information display module 185 may output a payment application execution screen on a display 160 of FIG. 2. Alternatively, after the payment application is executed, if user authentication is completed, the information display module 185 may output a first UI corresponding to the user authentication on the display 160. The first UI may include a first display object 161 of FIG. 1 associated with a payment processing function based on the NFC module 171, a second display object 163 of FIG. 1 associated with a payment processing function based on the MST module 173, and the like. Also, the first UI may further include an object of a card to pay.

After the first sensor information is received, if the communication channel based on the NFC module 171 is not established without a specific time, or if a signal based on the NFC module 171 is not received from the second payment processing device 104, the information display module 185 may output a second UI. The second UI may include, for example, information including at least one of text or an image for guiding a payment operation based on the MST module 173. If a signal based on the NFC module 171 is received, the information display module 185 may output a third UI for guiding a payment procedure based on the NFC module 171. According to embodiments of the present disclosure, if the second sensor information is received in a state where the second UI is output, the information display module 185 may output a fourth UI corresponding to a payment completion state. If a specific signal or sensor information associated with proceeding with payment is not received, the information display module 185 may output error information corresponding to that the specific signal or the sensor information is not received.

According to embodiments of the present disclosure, an electronic device may include a memory configured to store payment related information, a processor configured to connect with the memory, and a communication module configured to send the payment related information. The processor (or instructions executed by the processor) may configured to output payment mode guide information (e.g., a first UI) corresponding to a payment progress request and to send the payment related information through the communication module (e.g., an MST module), while outputting a payment progress guide (e.g., a second UI and a UI for guiding a card swiping operation) if a specific sensor signal (e.g., an acceleration sensor signal and the like) is collected.

According to embodiments of the present disclosure, an electronic device may include a first communication module configured to support a first payment mode, a second communication module configured to support a second payment mode, and a processor configured to operatively connect with the first communication module and the second communication module. The processor may be configured to output a first UI in response to a payment request, to obtain payment related information using at least one of the first communication module, the second communication module, or a sensor module operatively connected with the processor, and to output a second UI based on the payment related information.

According to embodiments of the present disclosure, if a request to execute a payment function is received, the processor may perform a user authentication process and may output the first UI based on the performance of the user authentication process.

According to embodiments of the present disclosure, the processor may output a first display object associated with processing payment based on the first communication module and a second display object associated with processing payment based on the second communication module on the first UI.

According to embodiments of the present disclosure, the processor may output a third display object, associated with a payment card to be used for payment, on the first UI.

According to embodiments of the present disclosure, if the first UI is output, the processor may operate a sensor module and may collect sensor information.

According to embodiments of the present disclosure, after the first UI is output, if first sensor information corresponding to an operation of moving the electronic device in a specific direction is received, the processor may output the second UI.

According to embodiments of the present disclosure, the processor may send the payment related information based on the second communication module while outputting the second UI.

According to embodiments of the present disclosure, after the second UI is output, if specific second sensor information is received, the processor may complete payment.

According to embodiments of the present disclosure, after the second UI is output, the processor may activate at least one microphone. If a specific audio signal is collected, the processor may complete payment.

According to embodiments of the present disclosure, the processor may output the second UI for guiding a user of the electronic device to perform a gesture corresponding to a card swiping operation.

Figure 4:
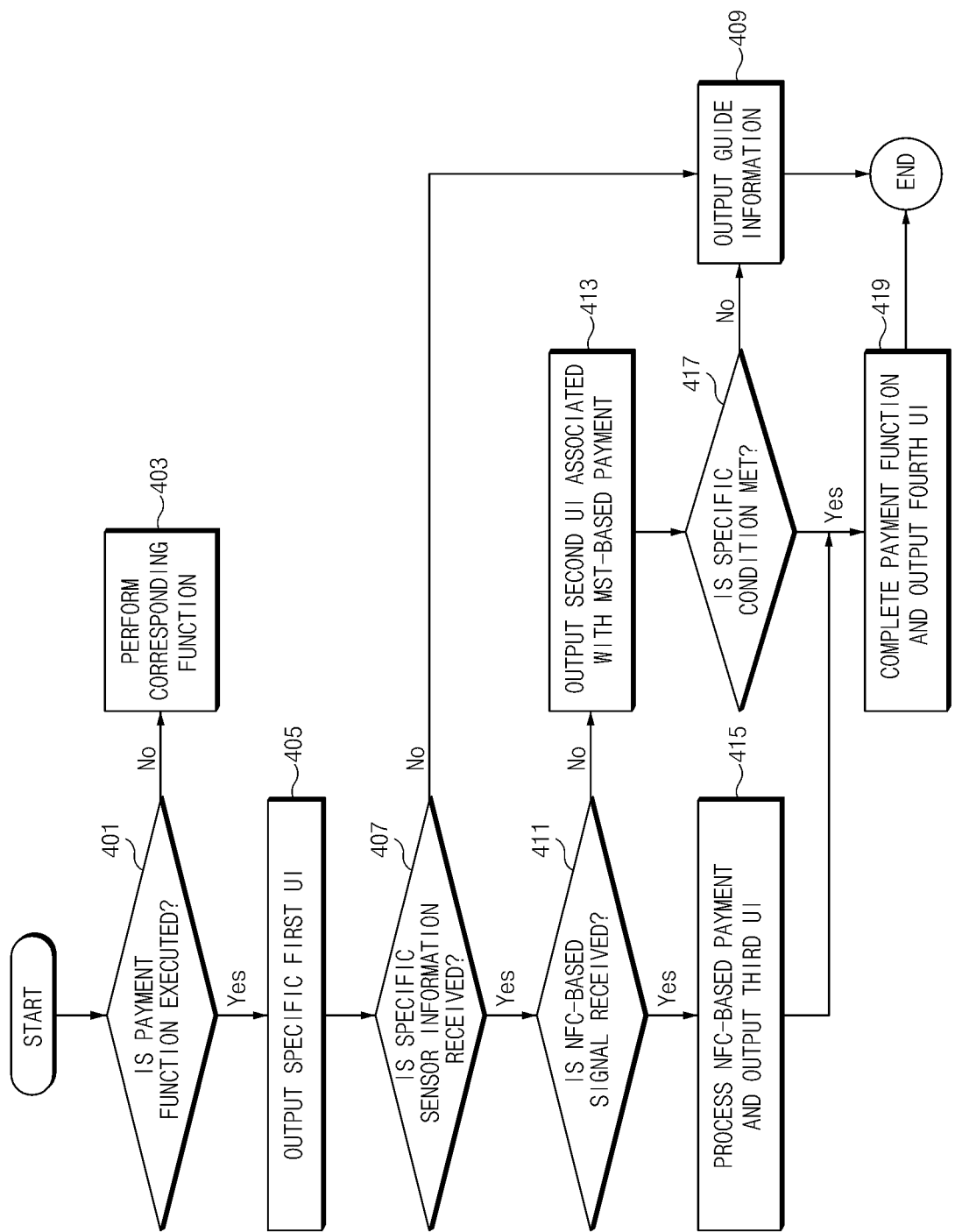
FIG. 4 is a flowchart illustrating a payment operation method according to an embodiment of the present disclosure.

FIG. 4 is a flowchart illustrating a payment operation method according to an embodiment of the present disclosure.

Referring to FIG. 4, in step 401 of the payment operation method, an electronic device 100 of FIG. 2 determines whether an event (e.g., a user input or the arrival of a specific schedule) for requesting to execute a payment function is generated. If the generated event is not associated with executing the payment function, in step 403, the electronic device 100 executes a function based on a type of the generated event. For example, the electronic device 100 may reproduce a file or may perform a web access function, based on the type of the event.

If the event for requesting to execute the payment function is generated, in step 405, the electronic device 100 outputs a specific first UI. In this operation, the electronic device 100 may perform user authentication (e.g., at least one of fingerprint authentication or voice authentication) in connection with executing the payment function. If the user authentication is normally performed, the electronic device 100 may execute the payment function. In connection with executing the payment function, the electronic device 100 may output a first display object 161 of FIG. 1 based on an NFC module 171 of FIG. 2 and a second display object 163 of FIG. 1 based on an MST module 173 of FIG. 2 on a display 160 of FIG. 2. The electronic device 100 may output card related information associated with proceeding with payment on the display 160 in the form of at least one of an image or text.

In step 405, the electronic device 100 may activate at least one of the NFC module 171 or the MST module 173. For example, the electronic device 100 may activate the NFC module 171 and may establish a communication channel with a first payment processing device 102 of FIG. 2 at a specific period. Alternatively, the electronic device 100 may control the MST module 173 to send payment related information during a specific period based on the MST module 173. In step 405, the electronic device 100 may activate a sensor module 190 of FIG. 2 and may collect sensor information.

In step 407, the electronic device 100 determines whether specific sensor information is received. For example, the electronic device 100 may determine whether first sensor information based on an operation of moving the electronic device 100 by a specific distance in a specific direction is received. If the specific sensor information is not received, in step 409, the electronic device 100 may output guide information. For example, the guide information may include information for guiding a payment error, information for requesting to perform a specific operation for payment, or information for guiding that it is impossible to perform payment.

If the specific sensor information (e.g., the first sensor information), in step 411 is received, the electronic device 100 may determine whether an NFC-based payment related signal is received. For example, the electronic device 100 may determine whether a specific signal is received through the NFC module 171. The electronic device 100 may send a scan signal based on the NFC module 171 and may determine whether a response signal corresponding to the corresponding signal is received.

In step 413, the electronic device 100 outputs, for example, a second UI associated with payment based on the MST module 173. The second UI associated with the payment based on the MST module 173 may include, for example, at least one of an image or text for guiding an operation of moving the electronic device 100 in a specific direction. For example, the second UI may display information for guiding the user to perform a similar operation to a card swiping operation in a state whether the electronic device 100 is close to a second payment processing device 104 of FIG. 2. If the second UI is output, the electronic device 100 may send payment related information based on the MST module 173.

If the payment related signal based on the NFC module 171, is received in step 415, the electronic device 100 may process NFC-based payment and may output a third UI associated with processing the NFC-based payment. The third UI may include, for example, at least one of text or an image for guiding that the payment is performed based on the NFC module 171. Alternatively, the third UI may include information for guiding that a current state is maintained during a specific time.

In step 417, the electronic device 100 determines whether a specific condition is met. For example, the electronic device 100 may determine whether information indicating payment completion is received from a server. If the information indicating the payment completion is not received within a specific time from the server (or a payment processing device), in step 409, the electronic device 100 outputs guide information. For example, the guide information may include information for requesting to perform a specific gesture operation. If the specific condition is met, in step 419, the electronic device 100 completes the payment function and outputs a fourth UI corresponding to the completion of the payment function. For example, the electronic device 100 may output a message indicating the completion of the payment function. The fourth UI may include information such as a payment amount and a payment card.

Figure 5:
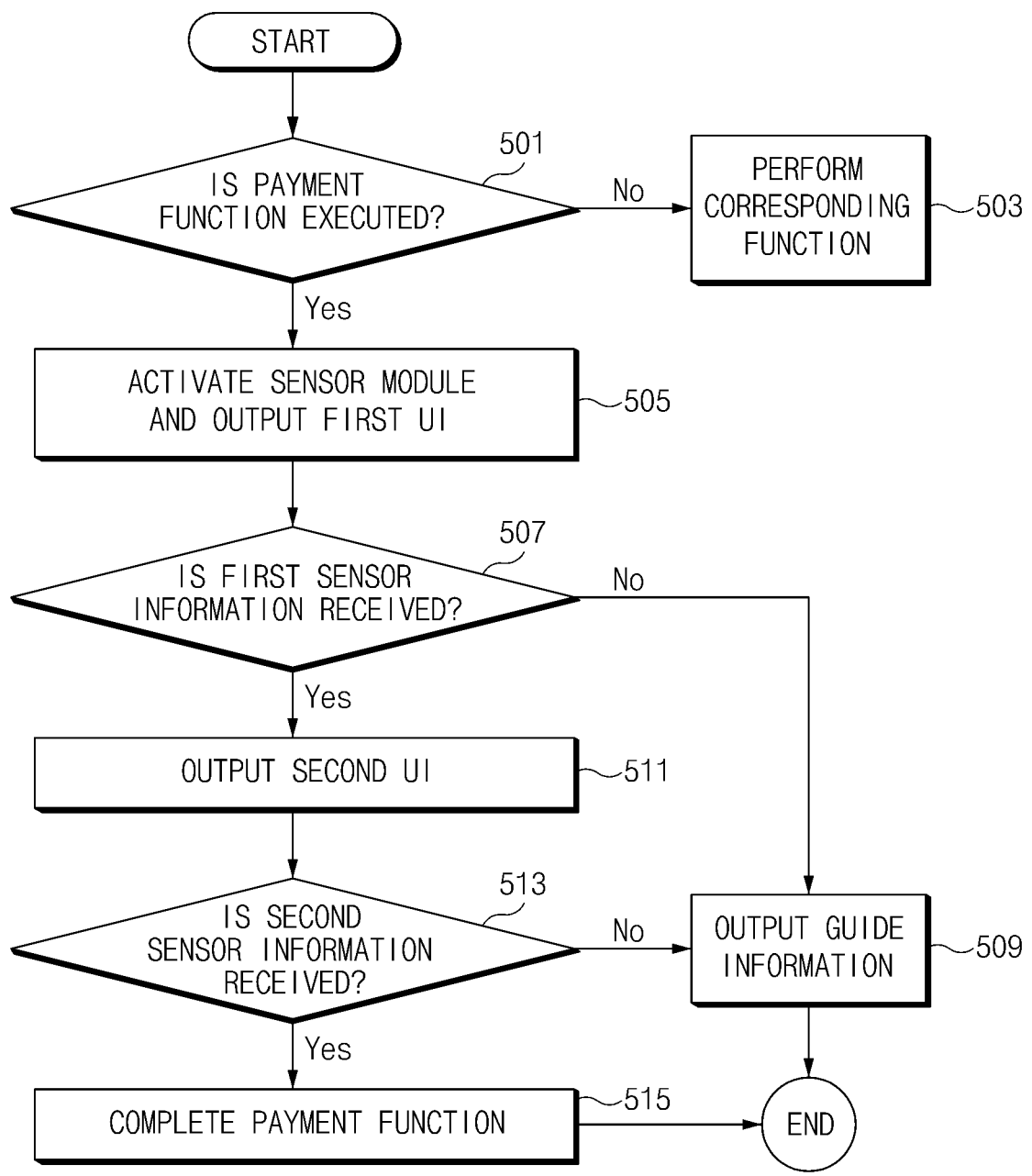
FIG. 5 is a flowchart illustrating a payment operation method according to another embodiment of the present disclosure.

FIG. 5 is a flowchart illustrating a payment operation method according to another embodiment of the present disclosure.

Referring to FIG. 5, in step 501 of the payment operation method, an electronic device 100 of FIG. 2 determines whether an event associated with executing a payment function is generated. If the generated event is not associated with executing the payment function, in step 503, the electronic device 100 performs a function corresponding to a type of the generated event. For example, the electronic device 100 may perform a web access function and the like based on the type of the event. In this regard, the electronic device 100 may output an icon or a menu for executing a payment application, If the event associated with executing the payment function is generated, in step 505, the electronic device 100 may activate a sensor module 190 of FIG. 2 and may output a first UI. The first UI may include display objects for guiding that it is possible to perform payment based on at least communication mode.

In step 507, the electronic device 100 may determine whether first sensor information is received. The electronic device 100 may determine whether sensor information collected by the sensor module 190 is the first sensor information corresponding to a specific gesture operation. If the first sensor information is not received, in step 509, the electronic device 100 may output specific guide information.

If the first sensor information is received, in step 511, the electronic device 100 may output a second UI. The second UI may include, for example, text or an image corresponding to a card swiping operation. According to embodiments of the present disclosure, the second UI may display an image for moving a second display object associated with an MST module 173 of FIG. 2 in a certain direction on the first UI or moving a third display object associated with a payment card in a certain direction on the first UI.

According to embodiments of the present disclosure, if a request to execute a payment function is received, the electronic device 100 may determine whether a device that supports MST or NFC payment is present outside (e.g., around) the electronic device 100. For example, if it is determined that the device that supports the MST payment is present outside (e.g., around) the electronic device 100, the electronic device 100 may display a screen indicating that it is possible to process payment using MST. For example, if it is determined that the device that supports the MST payment is present outside (or around) the electronic device 100, the electronic device 100 may display a screen for guiding a user of the electronic device 100 to approach the electronic device 100 to a card reader. For example, if it is determined that the device that supports the MST payment is present outside (or around) the electronic device 100 and if information associated with proceeding with payment is not received within a specific time, the electronic device 100 may display a screen for guiding the user to shake the electronic device 100.

In step 513, the electronic device 100 determines whether second sensor information is received. If the second sensor information is not received, the electronic device 100 branches to step 509 and outputs specific guide information. For example, the electronic device 100 may output information for guiding the user to perform a gesture operation associated with collecting the second sensor information. Alternatively, the electronic device 100 may output information associated with a payment error as the second sensor information is not received.

If the second sensor information is received, in step 515, the electronic device 100 completes the payment function. For example, after the second sensor information is received, if a specific time elapses, the electronic device 100 may perform processing corresponding to the completion of the payment function.

According to embodiments of the present disclosure, if it is designed to send payment related information based on the MST module 173 after the first sensor information is received, although a gesture operation corresponding to the second sensor information is not performed, the payment related information may be sent to a second payment processing device 104 of FIG. 2.

According to an embodiment of the present disclosure, in step 501, for example, the electronic device 100 may verify a request to execute the payment function. In step 505, for example, the electronic device 100 may output a UI (e.g., a screen or a sound) for guiding a mobile payment function in response to the request to execute the payment function. The UI may include, for example, information indicating at least one of a first payment mode (e.g., an NFC mode), a second payment mode (e.g., an MST mode), or a form of payment (e.g., a credit card, a bank account, a membership point, a mileage, a bitcoin, and the like).

The information indicating the first payment mode (e.g., the NFC mode) and the information indicating the second payment mode (e.g., the MST mode) may correspond to a first display object (e.g., the first display object 161 of FIG. 1) and a second display object (e.g., the second display object 163 of FIG. 1), respectively. For example, the first display object may be displayed in response to a location where an NFC signal is sent and received with a relative higher level than the other portion of the electronic device 100 (e.g., a location where an NFC antennal is present). The second display object may be displayed in response to a location where an MST signal is sent and received with a relatively higher level than the other portion of the electronic device 100 (e.g., a location where an MST antenna is present).

In step 511, for example, the electronic device 100 outputs a UI for at least one of the first payment mode or the second payment mode. For example, the electronic device 100 may change a UI for guiding information associated with payment based on an external payment processing device (a first payment processing device 102 of FIG. 2 or the second payment processing device 104) and may display the changed UI. In step 513, for example, the electronic device 100 verifies a signal associated with approve payment. For example, the electronic device 100 may verify a signal sent from the external payment processing device and may determine whether payment is approved or completed. For example, the electronic device 100 may determine whether payment is approved or completed through a variety of sensors (e.g., a proximity sensor, an illumination sensor, a microphone, and the like) that may be used in the electronic device 100.

The electronic device 100 may determine whether a specific audio signal (e.g., an audio signal indicating a state where the second payment processing device 104 receives payment related information and processes payment based on the payment related information) is output from the second payment processing device 104. In this regard, the electronic device 100 may activate at least one microphone after collecting the first sensor information and may collect an audio signal. If collecting the specific audio signal, the electronic device 100 may determine that the payment is completed.

According to embodiments of the present disclosure, after receiving the first sensor information, the electronic device 100 may complete payment based on whether at least one of reception of second sensor information or sending of a specific audio signal from the second payment processing device 104 is generated. After outputting the guide information in step 509 or after completing the payment function in step 515, the electronic device 100 branches to step 505 and performs step 505 again while maintaining the payment function based on a user input, the arrival of a specific schedule, entering a specific location, or a lapse of a specific time.

According to embodiments of the present disclosure, a payment operation method may include outputting a first UI associated with guiding a payment mode and sending payment related information while outputting a second UI if a specific sensor signal is collected.

According to embodiments of the present disclosure, the method may further include outputting a screen interface associated with a user authentication process if a request to execute a payment function and outputting the first UI based on the performance of the user authentication process is received.

According to embodiments of the present disclosure, the outputting of the first UI may include outputting a first display object associated with processing payment based on a first communication module and a second display object associated with processing payment based on a second communication module on the first UI.

According to embodiments of the present disclosure, the outputting of the first UI may include outputting a third display object, associated with a payment card to be used for payment, on the first UI According to embodiments of the present disclosure, the method may further include operating a sensor module and collecting sensor information, if the first UI is output.

According to embodiments of the present disclosure, the method may further include outputting the second UI, if first sensor information corresponding to an operation of moving an electronic device in a specific direction is received after the first UI is output.

According to embodiments of the present disclosure, the sending of the payment related information may include sending the payment related information based on the second communication module while outputting the second UI.

According to embodiments of the present disclosure, the method may further include completing payment, if specific second sensor information is received after the second UI is output.

According to embodiments of the present disclosure, the method may further include activating at least one microphone after the second UI is output and completing payment if a specific audio signal is collected.

According to embodiments of the present disclosure, the method may further include outputting the second UI for guiding a user of an electronic device to perform a gesture corresponding to a card swiping operation.

Figure 6:
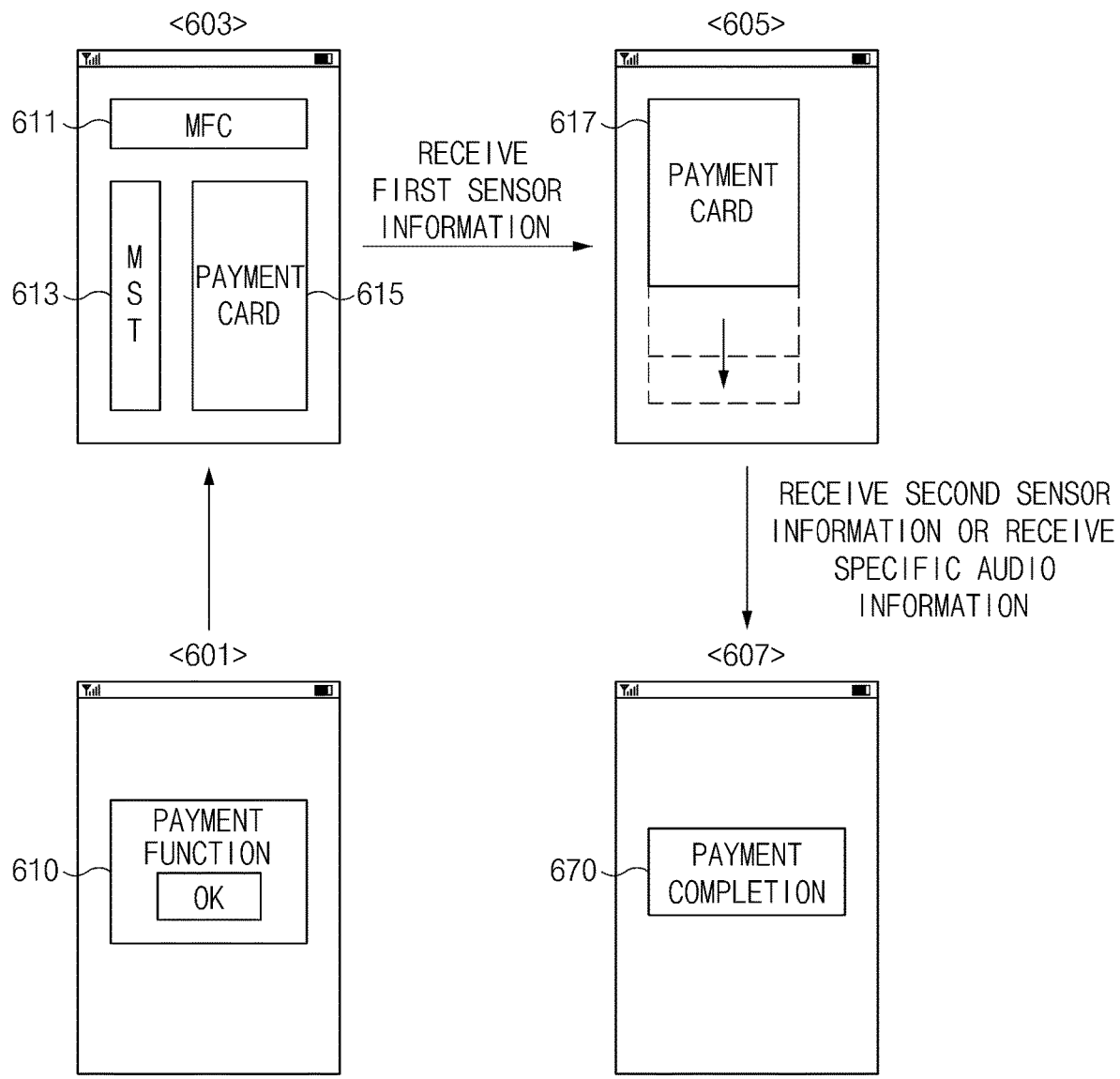
FIG. 6 is a diagram illustrating a payment operation screen interface according to an embodiment of the present disclosure.

FIG. 6 is a diagram illustrating a payment operation screen interface according to an embodiment of the present disclosure.

Referring to FIG. 6, in connection with executing a payment function, in state 601, an electronic device 100 of FIG. 2 may output at least one of an icon, a menu, a pop-up window associated with executing the payment function. According to embodiments of the present disclosure, if a request to execute the payment function is received, as shown in FIG. 6, the electronic device 100 may output a payment function execution determination region 610. Together with this operation, the electronic device 100 may perform a user authentication operation. For example, the electronic device 100 may perform a fingerprint authentication operation. Alternatively, the electronic device 100 may perform user authentication through a voice recognition operation.

If the user authentication is completed, in state 603, the electronic device 100 may output a first UI associated with proceeding with payment. The first UI may include a first display object 611 associated with a first communication module (e.g., an NFC module 171 of FIG. 2) associated with a first payment processing device 102 of FIG. 2 and a second display object 613 associated with a second communication module (e.g., an MST module 173 of FIG. 2) associated with a second payment processing device 104 of FIG. 2. The first display object 611 may be indicated in connection with, for example, a location of the NFC module 171 (or a location of an antenna associated with the NFC module 171) or a location where the NFC module 171 establishes a communication channel. According to an embodiment of the present disclosure, if an antenna that may communicate with the NFC module is arranged at an upper end of a rear surface of the electronic device 100, the first display object 611 may indicate a direction for guiding a user of the electronic device 100 to move the electronic device 100 to a first payment processing device 102 of FIG. 2 while displayed on an upper end of a display 160 of FIG. 2.

The second display object 613 may be indicated in connection with, for example, a location where the MST module 173 is arranged (or a location where an antenna associated with the MST module 173 is arranged) or a location where the MST module 173 establish a communication channel. According to an embodiment of the present disclosure, if an antenna that is able to communicate with the MST module 173 is arranged at a left side of the electronic device 100, as shown in FIG. 6, the second display object 613 may indicate a direction for guiding the user to moving the electronic device 100 to the second payment processing device 104 while displayed on a left side of the display 160.

Also, the first UI may include a third display object 615 associated with a payment card. The third display object 615 may include, for example, information indicating at least one payment card. The third display object 615 may be changed in response to a user input. For example, the user may operates the electronic device 100 to generate a user input (e.g., a touch event) associated with changing the third display object 615. If a plurality of payment cards (e.g., virtual payment cards or card images) are included in the electronic device 100, the electronic device 100 may output another payment card on the third display object 615 in response to a user input. According to embodiments of the present disclosure, the third display object 615 may correspond to a payment card that has recently used history. Alternatively, the third display object 615 may correspond to a specific payment card specified by the user. Alternatively, the third display object 615 may correspond to a payment card that has the highest bank balance.

After the first UI is output (or before the first UI is output), the electronic device 100 may activate a sensor that may collect sensor information based on occurrence of motion or may operate the activated sensor. According to an embodiment of the present disclosure, the electronic device 100 may collect sensor information using the activated sensor and may determine whether the collected sensor information corresponds to specific first sensor information. For example, if the electronic device 100 moves along a specific gesture (or motion) of the user, it may determine whether collected sensor information corresponds to first sensor information generated based on the movement of the electronic device 100 in the direction of a specific payment processing device (e.g., the second payment processing device 104 that supports payment based on the MST module 173). The electronic device 100 may collect the first sensor information based on the movement of the electronic device 100. If the first sensor information is collected, in state 605, the electronic device 100 may output a second UI. The second UI may output, for example, a fourth display object 617. For example, the fourth display object 617 may be a type of object that is the same or similar to the type of object as the third display object 615 associated with a payment card. The second UI may guide the user to perform a specific operation based on the electronic device 100 by displaying the fourth display object 617 to move in a specific direction on the display 160. The specific operation may be, for example, information corresponding to specific second sensor information.

According to an embodiment of the present disclosure, if the first sensor information or the second information is received, the electronic device 100 may send and receive information associated with payment through the first communication module (e.g., the NFC module 171) or the second communication module (e.g., the MST module 173).

In state 607, the electronic device 100 may output specific payment completion guide information 670 based on payment completion. For example, if at least one of reception of second sensor information or reception of specific audio signal is generated, the electronic device 100 may output the payment completion guide information 670.

According to an embodiment of the present disclosure; if payment through an NFC or MST mode is not processed while the first UI is output, the electronic device 100 may provide a UI (e.g., the second UI) for guiding the user to approach the electronic device 100 to a card reader or an NFC tag. If the payment through the MST mode is not processed, the electronic device 100 may provide a UI (e.g., the second UI) for guiding the user to approach the electronic device 100 to a card reader and to then shake the electronic device 100. For example, the electronic device 100 may activate a sensor module and may display information, indicating whether an operation of shaking the electronic device 100 meets criteria, through a screen, a sound, or a light emitting diode (LED) and the like.

Figure 7:
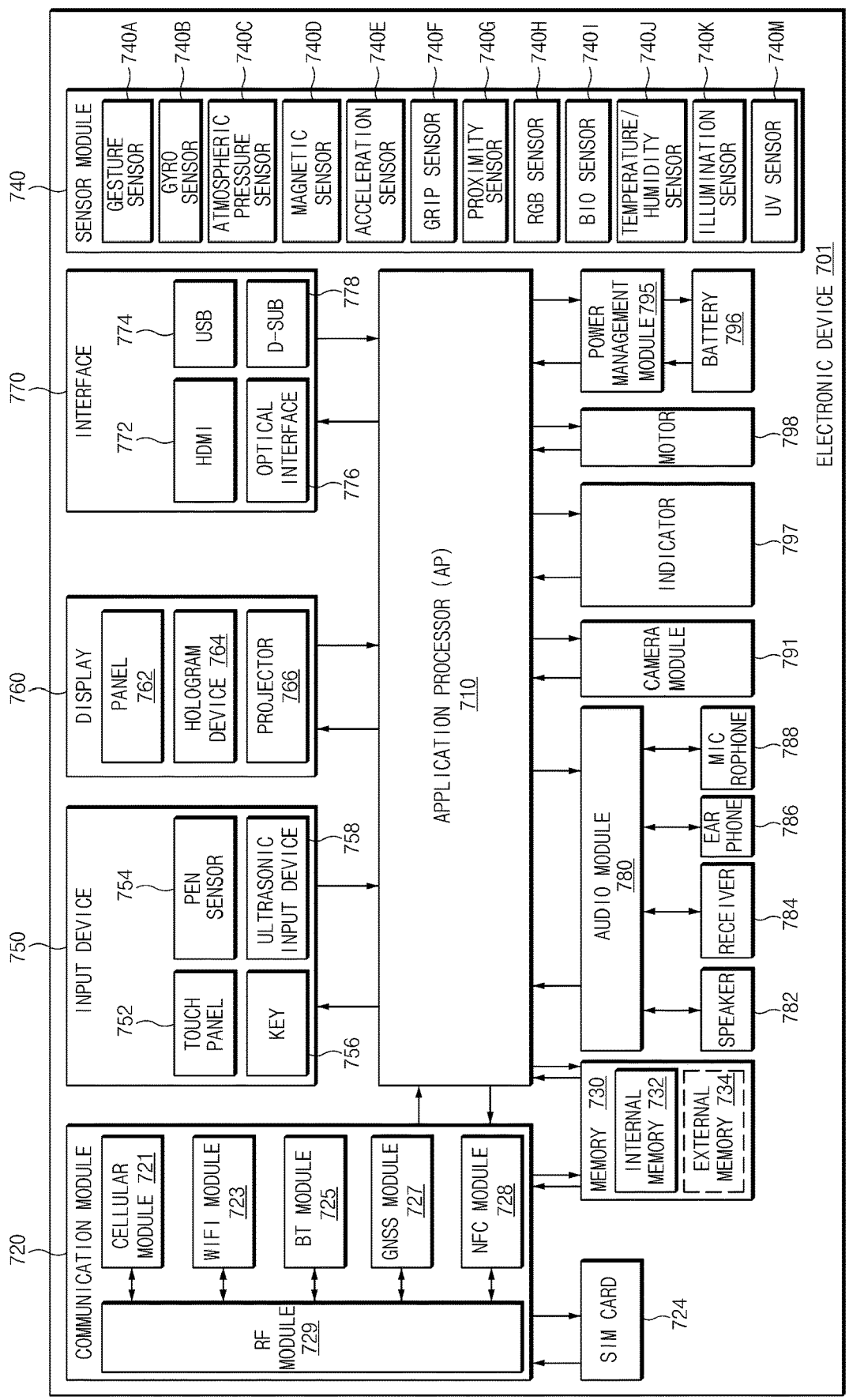
FIG. 7 is a block diagram illustrating a configuration of an electronic device according to an embodiment of the present disclosure.

FIG. 7 is a block diagram illustrating a configuration of an electronic device according to an embodiment of the present disclosure.

Referring to FIG. 7, an electronic device 701 may include, for example, all or part of the electronic device described in embodiments of the present disclosure above. The electronic device 701 may include one or more processors 710 (e.g., application processors (APs)), a communication module 720, a subscriber identification module (SIM) 724, a memory 730, a sensor module 740, an input device 750, a display 760, an interface 770, an audio module 780, a camera module 791, a power management module 795, a battery 796, an indicator 797, and a motor 798.

The processor 710 may drive, for example, an operating system (OS) or an application program to control a plurality of hardware or software components connected thereto and may process and compute a variety of data. The processor 710 may be implemented with, for example, a system on chip (SoC). According to an embodiment of the present disclosure, the processor 710 may include a graphic processing unit (GPU) and/or an image signal processor. The processor 710 may include at least some (e.g., a cellular module 721) of the components shown in FIG. 7. The processor 710 may load instructions or data received from at least one of other components (e.g., a non-volatile memory) into a volatile memory to process the data and may store various data in a non-volatile memory.

The communication module 720 may have the same or similar configuration as the configured of the communication interface 170 of FIG. 2. The communication module 720 may include, for example, the cellular module 721, a wireless-fidelity (Wi-Fi) module 723, a Bluetooth (BT) module 725, a global navigation satellite system (GNSS) module 727 (e.g., a GPS module, a Glonass module, a Beidou module, or a Galileo module), a near field communication (NFC) module 728, and a radio frequency (RF) module 729. In additional, the communication module 720 may further include a magnetic secure transmission (MST) module.

The cellular module 721 may provide, for example, a voice call service, a video call service, a text message service, or an Internet service, and the like through a communication network. According to an embodiment of the present disclosure, the cellular module 721 may identify and authenticate the electronic device 701 in a communication network using the SIM 724 (e.g., a SIM card). The cellular module 721 may perform at least part of functions that may be provided by the processor 710. According to an embodiment of the present disclosure, the cellular module 721 may include a communication processor (CP).

The Wi-Fi module 723, the BT module 725, the GNSS module 727, or the NFC module 728 may include, for example, a processor for processing data transmitted and received through the corresponding module. According to embodiments of the present disclosure, at least some (e.g., two or more) of the cellular module 721, the Wi-Fi module 723, the BT module 725, the GNSS module 727, or the NFC module 728 may be included in one integrated chip (IC) or one IC package.

The RF module 729 may transmit and receive, for example, a communication signal (e.g., an RF signal). The RF module 729 may include, for example, a transceiver, a power amplifier module (PAM), a frequency filter, or a low noise amplifier (LNA), or an antenna, and the like. According to another embodiment of the present disclosure, at least one of the cellular module 721, the Wi-Fi module 723, the BT module 725, the GNSS module 727, or the NFC module 728 may transmit and receive an RF signal through a separate RF module.

The SIM 724 may include, for example, a card that includes a SIM and/or an embedded SIM. The SIM 224 may include unique identification information (e.g., an integrated circuit card identifier (ICCID)) or subscriber information (e.g., an international mobile subscriber identity (IMSI)).

The memory 730 (e.g., a memory 130 of FIG. 2) may include, for example, an embedded memory 732 or an external memory 734. The embedded memory 732 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 734 may include a flash drive, for example, a compact flash (CF), a secure digital (SD), a micro-SD, a mini-SD, an extreme digital (xD), a multimedia car (MMC), or a memory stick, and the like. The external memory 734 may operatively and/or physically connect with the electronic device 201 through various interfaces.

The electronic device 701 may further include a secure module. The secure module may be a module that has a relatively higher secure level than the memory 730 and may be a circuit that stores secure data and guarantees a protected execution environment. The secure module may be implemented with a separate circuit and may include a separate processor. The secure module may include, for example, an embedded secure element (eSE) that is present in a removable smart chip or a removable SD card or is embedded in a fixed chip of the electronic device 701. Also, the secure module may be driven by an OS different from the OS of the electronic device 701. For example, the secure module may operate based on a Java card open platform (JCOP) OS.

The sensor module 740 may measure, for example, a physical quantity or may detect an operation state of the electronic device 701, and may convert the measured or detected information to an electric signal. The sensor module 740 may include at least one of, for example, a gesture sensor 740A, a gyro sensor 740B, a barometric pressure sensor 740C, a magnetic sensor 740D, an acceleration sensor 740E, a grip sensor 740F, a proximity sensor 740G, a color sensor 740H (e.g., red, green, blue (RGB) sensor), a biometric sensor 740I, a temperature/humidity sensor 740J, an illumination sensor 740K, or an ultraviolet (UV) sensor 740M. Additionally or alternatively, the sensor module 740 may further include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor, and the like. The sensor module 740 may further include a control circuit for controlling at least one or more sensors included therein. According to embodiments of the present disclosure, the electronic device 701 may further include a processor configured to control the sensor module 740, as part of the processor 710 or to be independent of the processor 710. While the processor 710 is in a sleep state, the electronic device 701 may control the sensor module 740.

The input device 750 may include, for example, a touch panel 752, a (digital) pen sensor 754, a key 756, or an ultrasonic input unit 758. The touch panel 752 may use at least one of, for example, a capacitive type, a resistive type, an infrared type, or an ultrasonic type. Also, the touch panel 752 may further include a control circuit. The touch panel 752 may further include a tactile layer and may provide a tactile reaction to a user.

The (digital) pen sensor 754 may be, for example, part of the touch panel 752 or may include a separate sheet for recognition. The key 756 may include, for example, a physical button, an optical key, or a keypad. The ultrasonic input unit 758 may allow the electronic device 701 to detect a sound wave using a microphone 788 and to verify data through an input tool generating an ultrasonic signal.

The display module 760 (e.g., a display 160 of FIG. 2) may include a panel 762, a hologram device 764, or a projector 766. The panel 762 may include the same or similar configuration to the display 160. The panel 762 may be implemented to be, for example, flexible, transparent, or wearable. The panel 762 and the touch panel 752 may be integrated into one module. The hologram device 764 may show a stereoscopic image in a space using interference of light. The projector 766 may project light onto a screen to display an image. The screen may be positioned, for example, inside or outside the electronic device 701. According to an embodiment of the present disclosure, the display 760 may further include a control circuit for controlling the panel 762, the hologram device 764, or the projector 766.

The interface 770 may include, for example, a high-definition multimedia interface (HDMI) 772, a universal serial bus (USB) 774, an optical interface 776, or a D-subminiature 778. The interface 770 may be included in, for example, a communication interface 170 shown in FIG. 2. Additionally or alternatively, the interface 770 may include, for example, a mobile high definition link (MHL) interface, an SD card/multimedia card (MMC) interface, or an infrared data association (IrDA) standard interface.

The audio module 780 may convert a sound and an electric signal in dual directions. At least part of components of the audio module 780 may be included in, for example, an input and output interface 150 shown in FIG. 2. The audio module 780 may process sound information input or output through, for example, a speaker 782, a receiver 784, an earphone 786, or the microphone 788, and the like.

The camera module 791 may be a device that captures a still image and a moving image. According to an embodiment of the present disclosure, the camera module 791 may include one or more image sensors (e.g., a front sensor or a rear sensor), a lens, an image signal processor (ISP), or a flash (e.g., an LED or a xenon lamp).

The power management module 795 may manage, for example, power of the electronic device 701. According to an embodiment of the present disclosure, the power management module 795 may include a power management integrated circuit (PMIC), a charger IC or a battery gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 796 and voltage, current, or temperature thereof while the battery 796 is charged. The battery 796 may include, for example, a rechargeable battery or a solar battery.

The indicator 797 may display a specific state of the electronic device 701 or part (e.g., the processor 120) thereof, for example, a booting state, a message state, or a charging state, and the like. The motor 798 may convert an electric signal into mechanical vibration and may generate vibration or a haptic effect, and the like. The electronic device 701 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Figure 8:
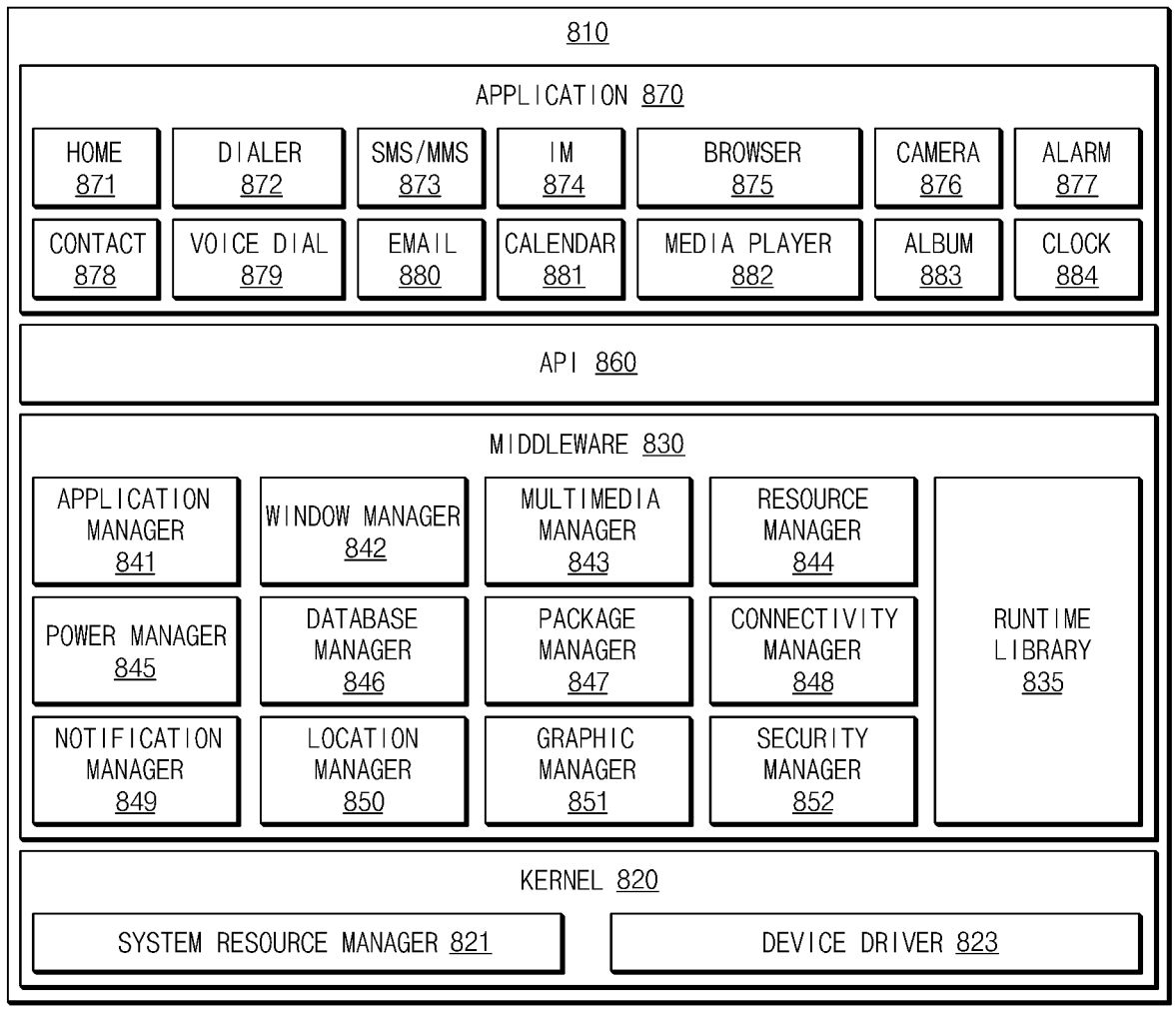
FIG. 8 is a block diagram illustrating a configuration of a program module according to an embodiment of the present disclosure.

FIG. 8 is a block diagram illustrating a configuration of a program module according to an embodiment of the present disclosure.

Referring to FIG. 8, according to embodiments of the present disclosure, the program module 810 (e.g., a program 140 of FIG. 2) may include an operating system (OS) for controlling resources associated with an electronic device (e.g., an electronic device 100 of FIG. 2) and/or various applications (e.g., an application program 147 of FIG. 2) that are executed on the OS. The OS may be, for example, Android, iOS, Windows, Symbian, Tizen, or Bada, and the like.

The program module 810 may include a kernel 820, a middleware 830, an application programming interface (API) 860, and/or at least one application 870. At least part of the program module 810 may be preloaded on the electronic device, or may be downloaded from an external electronic device (e.g., a first payment processing device 102, a second payment processing device 104, a server 106, and the like of FIG. 2).

The kernel 820 (e.g., a kernel 141 of FIG. 2) may include, for example, a system resource manager 821 and/or a device driver 823. The system resource manager 821 may control, assign, or collect, and the like system resources. According to an embodiment of the present disclosure, the system resource manager 821 may include a process management unit, a memory management unit, or a file system management unit, and the like. The device driver 823 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 830 (e.g., a middleware 143 of FIG. 2) may provide, for example, functions the application 870 needs in common, and may provide various functions to the application 870 through the API 860 such that the application 870 efficiently uses limited system resources in the electronic device. According to an embodiment of the present disclosure, the middleware 830 (e.g., the middleware 143) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, or a payment manager.

The runtime library 835 may include, for example, a library module used by a compiler to add a new function through a programming language while the application 370 is executed. The runtime library 835 may perform a function about input and output management, memory management, or an arithmetic function.

The application manager 841 may manage, for example, a life cycle of at least one of the at least one application 870. The window manager 842 may manage graphic user interface (GUI) resources used on a screen of the electronic device. The multimedia manager 843 may ascertain a format necessary for reproducing various media files and may encode or decode a media file using a codec corresponding to the corresponding format. The resource manager 844 may manage source codes of at least one of the at least one application 870, and may manage resources of a memory or a storage space, and the like.

The power manager 845 may act together with, for example, a basic input/output system (BIOS) and the like, may manage a battery or a power source, and may provide power information necessary for an operation of the electronic device. The database manager 846 may generate, search, or change a database to be used in at least one of the at least one application 870. The package manager 847 may manage installation or update of an application distributed in the form of a package file.

The connectivity manager 848 may manage, for example, wireless connection such as Wi-Fi connection or BT connection, and the like. The notification manager 849 may display or notify events, such as an arrival message, an appointment, and proximity notification, by a method that is not disturbed to the user. The location manager 850 may manage location information of the electronic device. The graphic manager 851 may manage a graphic effect to be provided to the user or a user interface (UI) related to the graphic effect. The security manager 852 may provide all security functions necessary for system security or user authentication, and the like. According to an embodiment, when the electronic device (e.g., the electronic device 100) has a phone function, the middleware 830 may further include a telephony manager for managing a voice or video communication function of the electronic device. The middleware 830 may further include a payment manager. The payment manager may relay information for payment from the application 870 to the application 870 or the kernel 820. Also, the payment manager may send information, associated with payment, received from the external device in the electronic device or may send information stored in the electronic device to the external device.

The middleware 830 may include a middleware module that configures combinations of various functions of the above-described components. The middleware 830 may provide a module that specializes according to kinds of OSs to provide a differentiated function. Also, the middleware 830 may dynamically delete some old components or may add new components.

The API 860 (e.g., an API 145 of FIG. 2) may be, for example, a set of API programming functions, and may be provided with different components according to OSs. For example, in case of Android or iOS, one API set may be provided according to platforms. In case of Tizen, two or more API sets may be provided according to platforms.

The application 870 (e.g., the application program 147) may include one or more of, for example, a home application 871, a dialer application 872, a short message service/multimedia message service (SMS/MMS) application 873, an instant message (IM) application 874, a browser application 875, a camera application 876, an alarm application 877, a contact application 878, a voice dial application 879, an e-mail application 880, a calendar application 881, a media player application 882, an album application 883, a clock application 884, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 870 may include an application (i.e., an information exchange application) for exchanging information between the electronic device (e.g., the electronic device 100) and an external electronic device (e.g., the first payment processing device 102 or the second payment processing device 104). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first payment processing device 102 or the second payment processing device 104). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first payment processing device 102 or the second payment processing device 104) that communicates with the electronic device, an application that operates in the external electronic device, or a service (e.g., a call service or a message service) provided from the external electronic device.

According to an embodiment of the present disclosure, the application 870 may include an application (e.g., the health card application of a mobile medical device) that is preset according to attributes of the external electronic device (e.g., the first payment processing device 102 or the second payment processing device 104 The application 870 may include an application received from the external electronic device (e.g., the server 106, the first payment processing device 102, or the second payment processing device 104). The application 870 may include a preloaded application or a third party application that may be downloaded from a server. Names of the components of the program module 810 according to embodiments of the present disclosure may differ according to kinds of OSs.

According to embodiments, at least part of the program module 810 may be implemented with software, firmware, hardware, or at least two or more combinations thereof. At least part of the program module 810 may be implemented (e.g., executed) by, for example, a processor (e.g., a processor 120 of FIG. 2). At least part of the program module 810 may include, for example, a module, a program, a routine, sets of instructions, or a process, and the like for performing one or more functions.

Each of the above-mentioned elements of the electronic device according to embodiments of the present disclosure may be configured with one or more components, and names of the corresponding elements may be changed according to the type of the electronic device. The electronic device may include at least one of the above-mentioned elements, some elements may be omitted from the electronic device, or other additional elements may be further included in the electronic device. Also, some of the elements of the electronic device may be combined with each other to form one entity, thereby making it possible to perform the functions of the corresponding elements in the same manner as before the combination.

The term "module" used herein may mean, for example, a unit including one of hardware, software, and firmware or two or more combinations thereof. The term "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to embodiments of the present disclosure, at least part of a device (e.g., modules or the functions) or a method (e.g., operations) may be implemented with, for example, instructions stored in computer-readable storage media that have a program module. When the instructions are executed by a processor (e.g., a processor 120 of FIG. 2), one or more processors may perform functions corresponding to the instructions. The computer-readable storage media may be, for example, a memory 130 of FIG. 2.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes that may be executed by a computer using an interpreter and the like. The above-mentioned hardware device may be configured to operate as one or more software modules to perform operations according to embodiments of the present disclosure, and vice versa.

According to embodiments of the present disclosure, the electronic device may more easily perform payment based on a specific payment operation.

According to embodiments of the present disclosure, the electronic device may provide an intuitive user interface for conveniently selecting a proper payment mode among a variety of payment modes.

According to embodiments of the present disclosure, the electronic device may reduce power consumed by a payment function by automatically turning off at least one of an NFC function or an MST function.

Modules or program modules according to embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added. Embodiments of the present disclosure described and shown in the drawings are provided as examples to describe technical content and help understanding but do not limit the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

What is claimed is:
1. An electronic device, comprising:
a touch screen display;

a first communication circuitry including an antenna corresponding to a near field communication (NFC) configured to support a NFC payment function;

a second communication circuitry corresponding to a magnetic secure transmission (MST) configured to support a MST payment function; and a processor operatively connected with the touch screen display, the first communication circuitry, and the second communication circuitry, wherein the processor is configured to:

control the touch screen display to output a first user interface (UI) corresponding to a user authentication process when a payment request is received via the touch screen display, in response to performing the user authentication process, activate at least one of the first communication circuitry including the antenna and the second communication circuitry, sense whether a signal related to the NFC payment function is received using the antenna after the first UI is output, and in response to sensing whether the signal related to the NFC payment function is received:

if the signal related to the NFC payment function is not received after the first UI is output, control the touch screen display to output a second UI including guide information associated with the MST payment function and complete the payment request by the second communication circuitry, or if the signal related to the NFC payment function is received after the first UI is output, control the touch screen display to output a third UI including guide information associated with the NFC payment function and complete the payment request by the first communication circuitry.

2. The electronic device of claim 1, wherein the processor is further configured to:

control the touch screen display to output a first display object on the first UL wherein the first display object is associated with payment processing based on the first communication circuitry.

3. The electronic device of claim 1, wherein the processor is further configured to:

control the touch screen display to output a second display object on the first UI, wherein the second display object is associated with payment processing based on the second communication circuitry.

4. The electronic device of claim 3, wherein the processor is further configured to:

control the touch screen display to output a third display object on the first UI, wherein the third display object is associated with a payment card to be used for payment.

5. The electronic device of claim 1, wherein the processor is further configured to:

after the first UI is output, operate a sensor circuitry and collect sensor information.

6. The electronic device of claim 5, wherein the processor is further configured to:

if first sensor information corresponding to an operation of moving the electronic device in a specific direction is received after the first UI is output, control the touch screen display to output the second UI.

7. The electronic device of claim 6, wherein the processor is further configured to:

while the third UI is output, send the payment request related information based on the first communication circuitry.

8. The electronic device of claim 6, wherein the processor is further configured to:

if second sensor information corresponding to a gesture associated with processing payment is received after the second UI is output, wherein the gesture includes one of shaking the electronic device or moving the electronic device, complete the payment request.

9. The electronic device of claim 6, wherein the processor is further configured to:

after the second UI is output, activate at least one microphone; and if an audio signal is collected using the at least one microphone, complete the payment request.

10. The electronic device of claim 6, wherein the second UI includes a guide for a user of the electronic device to perform a gesture corresponding to a card swiping operation.

11. A method, comprising:

outputting, by a processor, a first user interface (UI) corresponding to a user authentication process on a touch screen display of an electronic device when a payment request is received, wherein the processor is operatively connected with the touch screen display, a first communication circuitry including an antenna corresponding to a near field communication (NFC) configured to support a NFC payment function, and a second communication circuitry corresponding to a magnetic secure transmission (MST) configured to support a MST payment function;

in response to performing the user authentication process, activating at least one of the first communication circuitry including the antenna and the second communication circuitry;

sensing, by the antenna, whether a signal related to the NFC payment function is received after the first UI is output; and in response to sensing whether the signal related to the NFC payment function is received:

if the signal related to the NFC payment function is not received after the first UI is output, outputting, by the processor, a second UI including guide information associated with the MST payment function and complete, by the processor, the payment request by the second communication circuitry, or if the signal related to the NFC based payment is received after the first UI is output, outputting, by the processor, a third UI including guide information associated with the NFC payment function and complete, by the processor, the payment request by the first communication circuitry.

12. The method of claim 11, further comprising:

outputting, by the processor, a first display object on the first UI, wherein the first display object is associated with payment processing based on the first communication circuitry.

13. The method of claim 11, further comprising:

outputting, by the processor, a second display object on the first UI, wherein the second display object is associated with payment processing based on the second communication circuitry.

14. The method of claim 13, further comprising:

outputting, by the processor, a third display object on the first UI, wherein the third display object is associated with a payment card to be used for payment.

15. The method of claim 11, further comprising:
- after the first UI is output, operating a sensor circuitry and collecting sensor information.

16. The method of claim 15, further comprising:
- if first sensor information corresponding to an operation of moving an electronic device in a specific direction is received after the first UI is output, outputting the second UI.

17. The method of claim 16, wherein sending the payment related information comprises:
- while the third UI is output, sending the payment request related information based on the first communication circuitry.

18. The method of claim 16, further comprising:
- if second sensor information corresponding to a gesture associated with processing payment is received after the second UI is output, wherein the gesture includes one of shaking the electronic device or moving the electronic device, completing the payment request.

19. The method of claim 16, further comprising:
- after the second UI is output, activating at least one microphone; and
- if an audio signal is collected using the at least one microphone, completing the payment request.

20. The method of claim 16, further comprising:
- outputting the second UI includes a guide to prompt a user of the electronic device to perform a gesture corresponding to a card swiping operation.

* * * * *